United States Patent
Sakamoto et al.

(10) Patent No.: US 7,466,538 B2
(45) Date of Patent: Dec. 16, 2008

(54) MULTILAYER CERAMIC ELECTRONIC DEVICE

(75) Inventors: Norihiko Sakamoto, Matsue (JP); Tomoro Abe, Takefu (JP)

(73) Assignee: Murata Manufacturing Co., Ltd., Nagaokakyo-Shi (JP)

( * ) Notice: Subject to any disclaimer, the term of this patent is extended or adjusted under 35 U.S.C. 154(b) by 0 days.

(21) Appl. No.: 11/931,667

(22) Filed: Oct. 31, 2007

(65) Prior Publication Data

US 2008/0212257 A1    Sep. 4, 2008

Related U.S. Application Data

(63) Continuation of application No. PCT/JP2006/310303, filed on May 24, 2006.

(30) Foreign Application Priority Data

May 26, 2005    (JP)    ............................. 2005-153943

(51) Int. Cl.
    *H01G 4/06*    (2006.01)
(52) U.S. Cl. ............... 361/321.1; 361/321.2; 361/306.1; 361/306.2; 361/311; 361/313
(58) Field of Classification Search ............... 361/321.1, 361/321.2, 321.4, 321.5, 311–313, 302–305, 361/306.1, 306.2, 306.3, 301.1, 301.4
See application file for complete search history.

(56) References Cited

U.S. PATENT DOCUMENTS

| | | | | |
|---|---|---|---|---|
| 6,002,577 A | * | 12/1999 | Wada et al. | .................. 361/312 |
| 6,522,521 B2 | * | 2/2003 | Mizuno et al. | ........... 361/321.4 |
| 6,699,809 B2 | * | 3/2004 | Fujikawa et al. | ............. 501/138 |
| 6,829,137 B2 | * | 12/2004 | Konaka et al. | ........... 361/321.4 |
| 6,930,876 B1 | * | 8/2005 | Noguchi et al. | ............. 361/311 |
| 7,046,502 B2 | * | 5/2006 | Murosawa et al. | ........ 361/321.2 |

FOREIGN PATENT DOCUMENTS

JP    7-183155    7/1995

(Continued)

OTHER PUBLICATIONS

Written Opinion of the International Searching Authority for International Application No. PCT/JP2006/310303, date mailed Jul. 25, 2006.

*Primary Examiner*—Nguyen T Ha
(74) *Attorney, Agent, or Firm*—Dickstein, Shapiro, LLP.

(57) ABSTRACT

A highly reliable multilayer ceramic electronic device is obtained while preventing crack defects generated in a ceramic laminate by application of a heat shock in a mounting step or the like.

The multilayer ceramic electronic device is constructed such that the average value of continuities of internal electrodes located in two regions (f) is lower by 5% to 20% inclusive than the average value of continuities of internal electrodes located in the central portion in a lamination direction. The two regions (f) are the regions from the topmost internal electrode and the bottommost internal electrode located in the lamination direction to the inside, respectively, within 10% of the distance (d) therebetween. Continuity is defined by $(X-Y)/X$ in which X is the length of a cross section of an internal electrode in one direction and Y indicates the sum of gaps (g) formed by pores in the cross section of the internal electrode.

15 Claims, 2 Drawing Sheets

FOREIGN PATENT DOCUMENTS

| | | |
|---|---|---|
| JP | 8-055753 | 2/1996 |
| JP | 11-031633 | 2/1999 |
| JP | 2000-114098 | 4/2000 |
| JP | 2001-052950 | 2/2001 |
| JP | 2002-075771 | 3/2002 |
| JP | 2004-356333 | 12/2004 |

* cited by examiner

FIG. 3 - PRIOR ART
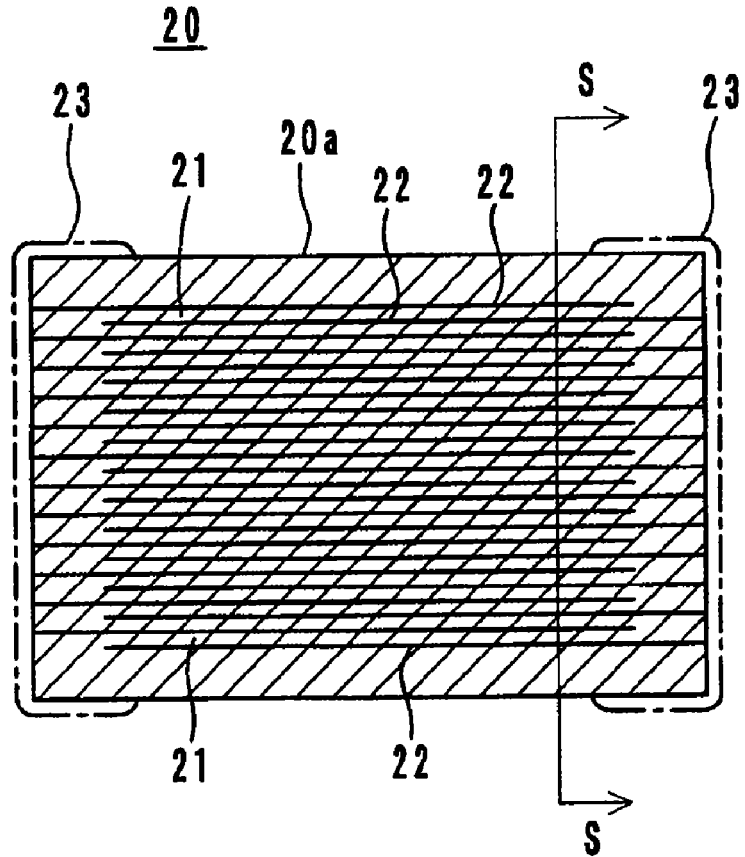
FIG. 4 - PRIOR ART
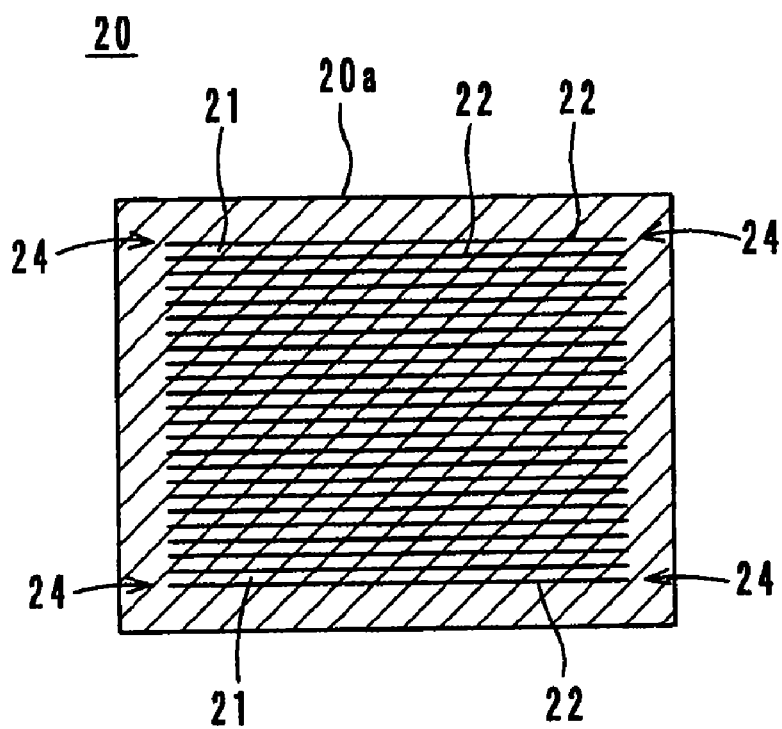

MULTILAYER CERAMIC ELECTRONIC DEVICE

This is a continuation of application Ser. No. PCT/JP2006/310303, filed May 24, 2006.

TECHNICAL FIELD

The present invention relates to a multilayer ceramic electronic device, and more particularly, relates to a multilayer ceramic electronic device in which internal electrodes are provided between ceramic layers laminated to each other.

BACKGROUND ART

Heretofore, a multilayer ceramic capacitor, which is a representative of multilayer ceramic electronic devices, has a cross-sectional structure shown in FIG. 3. This multilayer ceramic capacitor 20 has a ceramic laminate 20a including ceramic layers 21 and internal electrodes 22 which are provided therebetween to face each other. On two end portions of the ceramic laminate 20a, external electrodes 23 are provided, and the internal electrodes 22 are alternately extended to the respective external electrodes 23 and are electrically connected thereto.

Since they have a small size and are able to obtain a large capacitance, the multilayer ceramic capacitors 20 has been widely used in various applications. In addition, in order to further reduce the size and increase the capacitance, research and development has been carried out, for example, to decrease the thickness of the ceramic layer 21 provided between the internal electrodes 22 and to increase the number of the laminated internal electrodes 22 (that is, to form a thinner layer and a laminate with a larger number of layers).

However, concomitant with the decrease in thickness and the increase in number of layers to be laminated, peeling occurs at the interface between the internal electrode 22 and the ceramic layer 21 due to contraction strain in the ceramic laminate 20a generated during sintering, and cracking occurs in the ceramic layer 21. As a result, there has been a problem in that the above desired properties cannot be ensured. The problem described above does not only occur in the multilayer ceramic capacitor 20 having the structure shown in FIG. 3 but also occurs, for example, in layered-type varistors, thermistors, and piezoelectric devices, and in a multilayer substrates, which have a ceramic laminate including ceramic layers and internal electrodes provided therebetween to face each other.

In order to solve the above problem of the multilayer ceramic electronic device, a technique has been disclosed in Patent Document 1 in which the generation of contraction stress in the central portion of the ceramic layers 21 in the lamination direction is suppressed by adjusting the materials for the internal electrodes 22 so that a value representing the continuity of the internal electrode 22 is decreased toward the central portion of the ceramic layers 21 in the lamination direction in consideration of a phenomenon in which the number of cracks increases toward a central portion of the ceramic layers 21 in the lamination direction (central portion of the ceramic laminate 20a).

When a multilayer ceramic capacitor is manufactured, the generation of cracks in the laminate caused by contraction strain generated during sintering can be suppressed by the invention disclosed in Patent Document 1. However, since the materials for the internal electrode and the ceramic layer are different from each other in a completed multilayer ceramic capacitor as a product, the coefficients of thermal expansion thereof are different from each other. Hence, when a thermal stress (heat shock) is applied to the multilayer ceramic capacitor, for example, in a step of mounting it on a circuit substrate by reflow soldering, a stress corresponding to the difference in coefficient of thermal expansion is generated in the ceramic laminate, thereby generating cracks.

In FIG. 4 showing a cross-section taken along a line S-S in FIG. 3, a larger number of the cracks is generated in two end portions 24 in the short side direction of the internal electrodes 22 located in the vicinity of the uppermost portion and in two end portions 24 in the short side direction of the internal electrodes 22 located in the vicinity of the lowermost portion. Patent Document 1: Japanese Unexamined Patent Application Publication No. 11-31633

DISCLOSURE OF INVENTION

Problems to be Solved by the Invention

Accordingly, an object of the present invention is to provide a highly reliable multilayer ceramic electronic device which can solve the generation of crack defects in a ceramic laminate caused by applying a heat shock thereto in a mounting step or the like.

Means for Solving the Problems

To this end, a multilayer ceramic electronic device according to the present invention comprises ceramic layers laminated to each other and internal electrodes provided therebetween. In this multilayer ceramic electronic device, when continuity of each of the internal electrodes is defined by $(X-Y)/X$ in which X indicates the length of a cross section of an internal electrode in one direction and Y indicates the sum of gaps formed by pores in the cross section of the internal electrode, the average value of the continuities of internal electrodes located in two regions is set to be lower than the average value of the continuities of the other internal electrodes by 5% to 20% inclusive. The above two regions are the regions within 10% of the distance between the topmost internal electrode and the bottommost internal electrode from the topmost internal electrode and the bottommost internal electrode located in the lamination direction to the inside, respectively.

In the multilayer ceramic electronic device according to the present invention, the average value of the continuities of the topmost internal electrode, internal electrodes located in the vicinity of the topmost internal electrode, the bottommost internal electrode, and internal electrodes located in the vicinity of the bottommost internal electrode in the laminate is set lower than the average value of the continuities of internal electrodes located in the central portion of the laminate. That is, the topmost internal electrode, the internal electrodes located in the vicinity thereof, the bottommost internal electrode, and the internal electrodes in the vicinity thereof in the laminate have a lower electrode material density. Hence, when the laminate (including the ceramic layers and the internal electrodes) is thermally expanded by application of a heat shock thereto, the part composed of the internal electrodes having a lower electrode material density is likely to be deformed, and as a result, a stress applied to the ceramic layers is reduced. Accordingly, stresses generated in the topmost internal electrode, the internal electrodes in the vicinity thereof, the bottommost internal electrode, and the internal electrodes in the vicinity thereof of the laminate, and in particular, stresses generated in the two end portions of the above internal electrodes in the short side direction, are reduced. As a result, the generation of cracks in the above end portions can be prevented even when a heat shock is applied thereto.

When the difference between the average value of the continuities of the internal electrodes located in the above two regions and the average value of the continuities of the other internal electrodes is less than 5% and when the above difference is more than 20%, desired electrical properties cannot be obtained.

In the multilayer ceramic electronic device according to the present invention, nickel or a nickel alloy is preferably used for the internal electrodes in terms of cost.

In addition, the ceramic layer preferably has a thickness of 10 μm or less, and the number of laminated ceramic layers is preferably 100 or more. When a heat shock is applied, the influence of stress generated by the difference in the coefficients of thermal expansion between the internal electrode and the ceramic layer is increased as the thickness of the ceramic layer is decreased, and as a result, cracks tend to be easily generated in the laminate. This tendency becomes significant when the thickness of the ceramic layer is 10 μm or less. Even in the case described above, however, when the continuities of the internal electrodes are controlled as described above, the generation of cracks in the laminate can be prevented. In addition, when a heat shock is applied thereto, the influence of a stress generated by the difference in coefficient of thermal expansion between the internal electrode and the ceramic layer is increased particularly as more ceramic layers are laminated to each other to form the laminate, and as a result, cracks tend to be easily generated in the laminate. This tendency becomes significant when the number of laminated ceramic layers is 100 or more. Even in the case described above, however, the generation of cracks in the laminate can be prevented when the continuities of the internal electrodes are controlled as described above.

Advantages

According to the present invention, since the topmost internal electrode, the internal electrodes in the vicinity thereof, the bottommost internal electrode, and the internal electrodes in the vicinity thereof in the laminate have a low electrode material density, stresses generated in the topmost internal electrode, the internal electrodes in the vicinity thereof, the bottommost internal electrode, and the internal electrodes in the vicinity thereof, in particular, stresses generated in the two end portions of the above internal electrodes in the short side direction, are reduced when the laminate is thermally expanded by application of a heat shock thereto, and hence, the generation of cracks in the above portions can be prevented. Accordingly, a highly reliable multilayer ceramic electronic device can be obtained which has a heat shock resistance and which can reliably exhibit desired properties after mounting.

BRIEF DESCRIPTION OF THE DRAWINGS

FIG. 3 is a longitudinal sectional view of a conventional multilayer ceramic capacitor.

FIG. 4 is a cross-sectional view taken along a line S-S shown in FIG. 3.

BEST MODE FOR CARRYING OUT THE INVENTION

Here in after, multilayer ceramic electronic devices examples according to the present invention will be described with reference to accompanying drawings.

First Example

Figure 1:
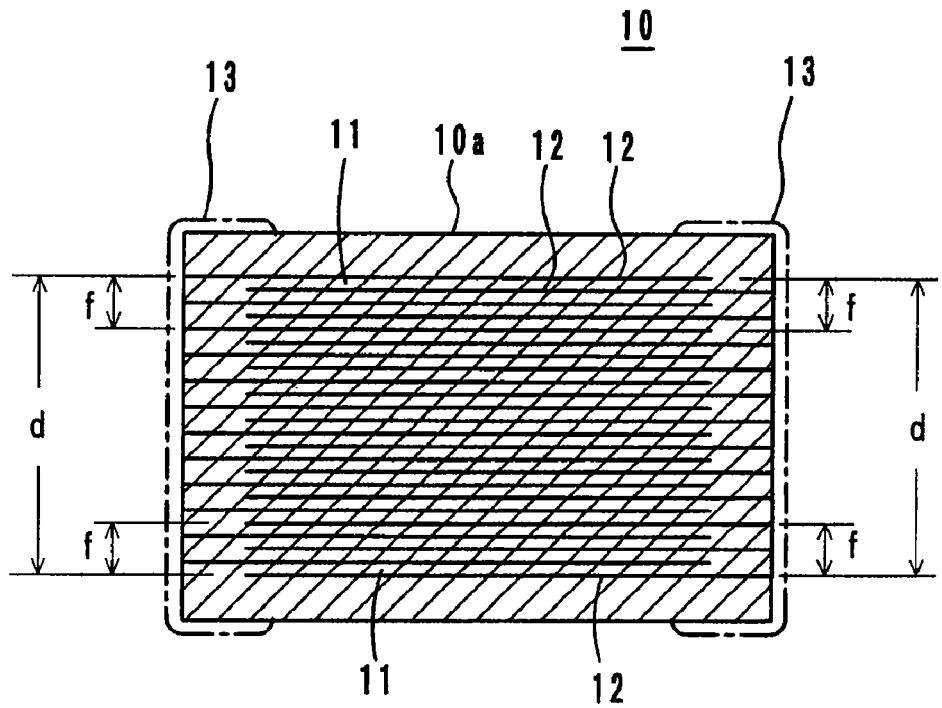
FIG. 1 is a longitudinal sectional view of a multilayer ceramic capacitor to which the present invention is applied.

A multilayer ceramic electronic device of the first example according to the present invention is a multilayer ceramic capacitor, and the longitudinal sectional structure thereof is shown in FIG. 1. This multilayer ceramic capacitor 10 includes a ceramic laminate 10a composed of ceramic layers 11 and internal electrodes 12 provided therebetween to face each other, the internal electrodes 12 being formed, for example, of Ni or a Ni alloy.

External electrodes 13 are formed on two end portions of the ceramic laminate 10a, and the internal electrodes 12 are alternately extended in opposite directions and are electrically connected to the respective external electrodes 13.

The ceramic layers 11 are all formed of ceramic green sheets prepared by processing a dielectric ceramic material using a doctor blade method, a pulling method or the like, and are laminated to each other together with the internal electrodes 12 formed on surfaces of the sheets, followed by pressure bonding and firing, so that the laminate 10a is formed.

Figure 2A:
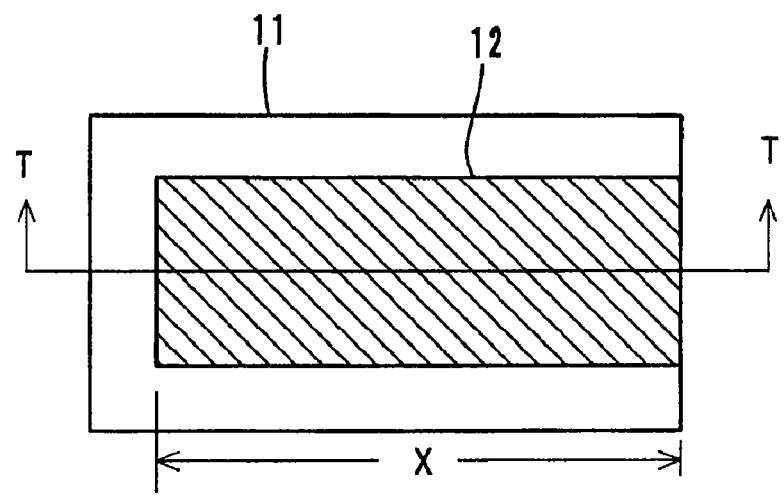
FIGS. 2a and 2b includes views illustrating the definition of continuity of an internal electrode, with 1a being a plan view, and 1b being a cross-sectional view showing gaps present along a line T-T.

The internal electrode 12 has a rectangular shape as shown in FIG. 2a and is formed on the ceramic green sheet using a conductive paste by printing. The internal electrode 12 is not formed from metal particles which are continuously and uniformly distributed on the ceramic layer 11, and when being microscopically observed, the internal electrode 12 has a great number of distributed pores. Accordingly, a value representing the continuity of the internal electrode 12 is defined as follows.

Figure 2B:
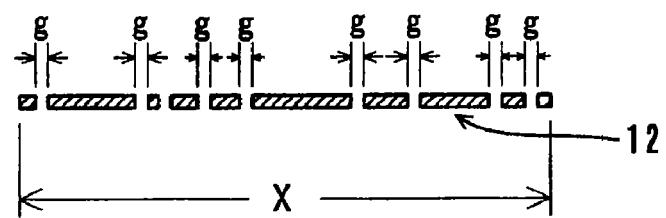

That is, as shown in FIGS. 2a and 2b, the continuity of the internal electrode 12 is defined as (X−Y)/X in which X indicates the length of a T-T line cross section along the center of the internal electrode 12 in a long side direction and Y is the sum of gaps g formed by pores in the cross section of the internal electrode 12. The value of the continuity thus defined can be controlled by changing the solid component ratio of the metal (such as Ni or a Ni alloy) in a conductive paste forming the internal electrode 12, the thickness of the internal electrode 12, and the metal particle diameter.

In this first example, the continuity is controlled based on the metal content in the conductive paste forming the internal electrode 12. Accordingly, the average value of the continuities of internal electrodes 12 located in regions f from the topmost internal electrode 12 and the bottommost internal electrode 12 located in the lamination direction to the inside, respectively, by 10% of a distance d therebetween, in this first example, is set to be lower than the average value of the continuities of the other internal electrodes 12 (located in a central portion in the lamination direction) by 5% to 20% inclusive. This value is obtained based on the results of a heat shock test as described below.

As common specifications of samples 1 to 7 of multilayer ceramic capacitors 10 used in the heat shock test, the dimensions of the ceramic laminate 10a, the thickness of the ceramic layer 11, the number of the laminated internal electrodes 12, the electrostatic capacitance, the metal content (solid component ratio) of the internal electrodes 12 located in the central portion of the ceramic laminate 10a in the lamination direction, and the average continuity value thereof were set as follows.

Dimensions of the ceramic laminate: 1.6 mm×0.8 mm×0.8 mm
 Thickness of the ceramic layer: 3.0 µm
 Number of the laminated ceramic layers: 180
 Thickness of the internal electrode: 0.68 µm
 Metal particle diameter of the internal electrode: 0.2 µm
 Electrostatic capacitance: 1 µF (target value)
 Metal content of the internal electrodes in the central portion in the lamination direction: 48%
 Average value of continuities of the internal electrodes in the central portion in the lamination direction: 70%

In addition, samples 1 to 7 having the above-described common specifications were prepared which had average values of 70.0% (sample 1), 67.9% (sample 2), 66.5% (sample 3), 63.0% (sample 4), 60.0% (sample 5), 56.0% (sample 6), and 52.5% (sample 7), the average values each being the average value of the continuities of the internal electrodes 12 located in the above two 10%-distance regions f (FIG. 1), and 50 test pieces of each of samples 1 to 7 were experimentally formed. For each of these samples 1 to 7, a heat shock test was performed in which after the test pieces were immersed in a solder bath at 325° C. for 2 seconds, and the generation of cracks was investigated using a microscope at a magnification of 50 times. The results are shown in Table 1 below.

electrodes 12 was 67.9% and in which the difference in continuity was 3%, had cracks generated in 2 out of 50 test pieces. Furthermore, sample No. 7 in which the average value of the continuities of the internal electrodes 12 was 52.5% and in which the difference in continuity was 25% failed to provide a desired electrostatic capacitance although no cracks were generated.

From the results obtained through the heat shock test of multilayer ceramic capacitors 10 having the structure shown in FIG. 1, the multilayer ceramic capacitors 10 in which the average of the continuities of the internal electrodes 12 located in the two 10%-distance regions f is lower than the average of the continuities of the other internal electrodes 12 by 5% to 20% inclusive, were those in which the generation of cracks in the laminate was prevented even when a heat shock is applied thereto during a mounting step or the like, the above two 10%-distance regions f being regions from the topmost internal electrode and the bottommost internal electrode located in the lamination direction to the inside, respectively, within 10% of the distance d therebetween.

Second Example

In this second example, the continuity of the internal electrode 12 is controlled by changing the thickness of the internal

TABLE 1

| Sample No. | Metal content of internal electrodes in regions f (%) | Average continuity of internal electrodes in regions f (%) | Difference in continuity of internal electrodes between central portion and regions f | Average electrostatic capacitance (µF) | Electrostatic capacitance CV value (%) | Number of cracks generated in heat shock test |
|---|---|---|---|---|---|---|
| *1 | 48.0 | 70.0 | 0% | 1.04 | 2.9 | 5/50 |
| *2 | 46.5 | 67.9 | 3% | 1.03 | 3.0 | 2/50 |
| 3 | 45.5 | 66.5 | 5% | 1.03 | 2.9 | 0/50 |
| 4 | 43.0 | 63.0 | 10% | 1.02 | 3.1 | 0/50 |
| 5 | 41.0 | 60.0 | 14% | 1.01 | 3.1 | 0/50 |
| 6 | 38.5 | 56.0 | 20% | 1.00 | 3.2 | 0/50 |
| *7 | 36.0 | 52.5 | 25% | 0.99 | 3.5 | 0/50 |

In the above Table 1, sample Nos. 1, 2, and 7 designated with * are comparative examples to this first example. In addition, the electrostatic capacitances of sample Nos. 1 to 7 in the above Table 1 each indicate the average obtained from 50 test pieces of each sample.

As can be seen from the above Table 1, sample No. 3 in which the average value of the continuities of the internal electrodes 12 located in the above-described two 10%-distance regions f was 66.5% and in which the difference in continuity from the internal electrodes 12 located in the central portion in the lamination direction was 5%, had a number of cracks generated in the heat shock test of 0.

In addition, sample No. 4 in which the average value of the continuities of the internal electrodes 12 was 63.0% and in which the difference in continuity was 10%, sample No. 5 in which the average value of the continuities of the internal electrodes 12 was 60.0% and in which the difference in continuity was 14%, and sample No. 6 in which the average value of the continuities of the internal electrodes 12 was 56.0% and in which the difference in continuity was 20%, also had a number of cracks generated in the heat shock test of 0.

On the other hand, sample No. 1 in which the average value of the continuities of the internal electrodes 12 was 70.0% and in which the difference in continuity was 0%, had cracks generated in 5 out of 50 test pieces. In addition, sample No. 2 in which the average value of the continuities of the internal electrode 12 in the multilayer ceramic capacitor 10 having the structure shown in FIG. 1. That is, the thicknesses of the internal electrodes 12 located in the two 10%-distance regions f in this second example are changed so that, as in the first example, the average value of the continuities of the internal electrodes 12 is set to be lower by 5% to 20% inclusive than the average value of the continuities of the internal electrodes 12 located in the central portion in the lamination direction, the two 10%-distance regions f being regions from the topmost internal electrode and the bottommost internal electrode located in the lamination direction to the inside, respectively, with 10% of the distance d therebetween.

Also in this second example, samples 1 to 7 having the following common specifications and the continuities of the internal electrodes 12 similar to those in the first example were experimentally formed, and a heat shock test similar to that in the first example was carried out. The results are shown in Table 2.

Dimensions of the ceramic laminate: 1.6 mm×0.8 mm×0.8 mm
 Thickness of the ceramic layer: 3.0 µm
 Number of the laminated ceramic layers: 180
 Metal particle diameter of the internal electrode: 0.2 µm
 Electrostatic capacitance: 1 µF (target value)
 Thickness of the internal electrodes in the central portion in the lamination direction: 0.68 µm Average value of continuities of the internal electrodes in the central portion in the lamination direction: 70%.

Dimensions of the ceramic laminate: 1.6 mm×0.8 mm×0.8 mm

TABLE 2

| Sample No. | Thickness of internal electrodes in regions f (μm) | Average continuity of internal electrodes in regions f (%) | Difference in continuity of internal electrodes between central portion and regions f | Average electrostatic capacitance (μF) | Electrostatic capacitance CV value (%) | Number of cracks generated in heat shock test |
|---|---|---|---|---|---|---|
| *1 | 0.68 | 70.0 | 0% | 1.04 | 2.9 | 5/50 |
| *2 | 0.67 | 68.0 | 3% | 1.03 | 3.0 | 3/50 |
| 3 | 0.66 | 66.0 | 6% | 1.03 | 3.0 | 0/50 |
| 4 | 0.64 | 62.5 | 11% | 1.02 | 3.1 | 0/50 |
| 5 | 0.62 | 59.5 | 15% | 1.01 | 3.2 | 0/50 |
| 6 | 0.60 | 56.5 | 19% | 1.00 | 3.4 | 0/50 |
| *7 | 0.56 | 50.0 | 29% | 0.98 | 3.6 | 0/50 |

As apparent from the results of the heat shock test shown in the above Table 2, results similar to those in the first example could be obtained in the multilayer ceramic capacitors 10 of the second example.

Third Example

In this third example, the continuity of the internal electrode 12 is controlled by changing the particle diameter of the metal (Ni or Ni alloy) forming the internal electrode 12 in the multilayer ceramic capacitor 10 having the structure shown in FIG. 1. That is, the metal particle diameter of the internal electrodes 12 located in the two 10%-distance d regions in this third example are changed so that, as in the first example, the average value of the continuities of the internal electrodes 12 is set to be lower by 5% to 20% inclusive than the average value of the continuities of the internal electrodes 12 located in the central portion in the lamination direction, the two 10%-distance regions f being regions from the topmost internal electrode and the bottommost internal electrode located in the lamination direction to the inside, respectively, within 10% of the distance d therebetween.

Also in this third example, samples 1 to 7 having the following common specifications and the continuities of the internal electrodes 12 similar to those in the first example were experimentally formed, and a heat shock test similar to that in the first example was carried out. The results are shown in Table 3.

Thickness of the ceramic layer: 3.0 μm

Number of the laminated ceramic layers: 180

Thickness of the internal electrode: 0.68 μm

Electrostatic capacitance: 1 μF (target value)

Metal particle diameter of the internal electrodes in the central portion in the lamination direction: 0.2 μm Average value of continuities of the internal electrodes in the central portion in the lamination direction: 70%

TABLE 3

| Sample No. | Metal particle diameter of internal electrodes in regions f (μm) | Average continuity of internal electrodes in regions f (%) | Difference in continuity of internal electrodes between central portion and regions f | Average electrostatic capacitance (μF) | Electrostatic capacitance CV value (%) | Number of cracks generated in heat shock test |
|---|---|---|---|---|---|---|
| *1 | 0.20 | 70.0 | 0% | 1.04 | 2.9 | 5/50 |
| *2 | 0.25 | 68.5 | 2% | 1.04 | 2.9 | 3/50 |
| 3 | 0.30 | 65.0 | 7% | 1.03 | 3.2 | 0/50 |
| 4 | 0.40 | 61.0 | 13% | 1.01 | 3.2 | 0/50 |
| 5 | 0.50 | 59.0 | 16% | 1.01 | 3.1 | 0/50 |
| 6 | 0.60 | 56.8 | 19% | 1.00 | 3.5 | 0/50 |
| *7 | 0.80 | 48.0 | 31% | 0.97 | 3.9 | 0/50 |

As apparent from the results of the heat shock test shown in the above Table 3, results similar to those in the first example could be obtained in the multilayer ceramic capacitors 10 of the third example.

Other Examples

The multilayer ceramic electronic device according to the present invention is not limited to the examples described above, and without departing from the spirit and the scope of the present invention, various modifications may be made.

For example, although the multilayer ceramic capacitors are described in the above examples, the present invention may be applied, for example, to a multilayer varistor, thermistor, and piezoelectric element, and to a multilayer substrate. In addition, the dimensions of the multilayer ceramic electronic device, the targeted electrostatic capacitance, the material and composition of the ceramic layer, the material for the internal electrode, and the like may be variously changed and modified.

INDUSTRIAL APPLICABILITY

As described above, the present invention is effectively applied to a multilayer ceramic electronic device in which internal electrodes are disposed between ceramic layers laminated to each other, and in particular, the present invention is superior in terms of improvement in reliability.

The invention claimed is:

1. A multilayer ceramic electronic device comprising a laminate of a plurality of ceramic layers laminated to each other and a plurality of internal electrodes each of which is disposed between adjacent ceramic layers wherein, when continuity of each of the internal electrodes is defined by $(X-Y)/X$ in which X indicates the length of a cross section of an internal electrode in one direction and Y indicates the sum of gaps formed by pores in the cross section of the internal electrode, the average value of continuities of the internal electrodes located in two regions (f) is lower than the average value of continuities of the other internal electrodes by 5% to 20% inclusive, the two regions (f) being the regions within 10% of the topmost internal electrode and the bottommost internal electrode of the distance therebetween.

2. The multilayer ceramic electronic device according to claim 1, wherein the internal electrodes comprise nickel.

3. The multilayer ceramic electronic device according to claim 2, wherein the thickness of each of the ceramic layers is 10 μm or less, and the number of laminated ceramic layers is 100 or more.

4. The multilayer ceramic electronic device according to claim 1, wherein the thickness of each of the ceramic layers is 10 μm or less, and the number of laminated ceramic layers is 100 or more.

5. The multilayer ceramic electronic device according to claim 1 which is a capacitor.

6. In a method of forming a multilayer ceramic electronic device comprising laminating a plurality of ceramic layers with a plurality of electrodes pastes comprising metal each of which is disposed between adjacent ceramic layers, and sintering the laminate, controlling the continuity of the electrodes such that the average value of continuity of each of the electrodes located in two regions (f) is lower than the average value of continuities of the other electrodes by 5% to 20% inclusive, wherein continuity is defined by $(X-Y)/X$ in which X indicates the length of a cross section of an electrode in one direction and Y indicates the sum of gaps formed by pores in the cross section of the electrode, and wherein the two regions (f) are the regions of the distance between the topmost and bottommost electrodes which are within 10% of the topmost electrode and the bottommost electrode.

7. The method according to claim 6, wherein the continuity is controlled by controlling the particle diameter of metal in the electrode.

8. The method according to claim 7, wherein the metal particle diameter in the electrodes disposed in regions f is greater than the metal particle diameter in the electrodes disposed in other regions.

9. The method according to claim 6, wherein the continuity is controlled by controlling the thickness of the electrodes.

10. The method according to claim 9, wherein the thickness of the electrodes disposed in regions f is less than the thickness of the electrodes disposed in other regions.

11. The method according to claim 6, wherein the continuity is controlled by controlling the solid content of the electrode pastes.

12. The method according to claim 11, wherein the solid content of the electrode paste for electrodes disposed in regions f is less than the solid content of electrode paste for electrodes disposed in other regions.

13. The method according to claim 6, wherein the thickness of each of the ceramic layers is 10 μm or less, and the number of laminated ceramic layers is 100 or more.

14. The method according to claim 13, wherein the ceramic layers and electrodes are disposed so as to form a capacitor.

15. The method according to claim 6, wherein the ceramic layers and electrodes are disposed so as to form a capacitor.

* * * * *